United States Patent [19]

Ylven

[11] Patent Number: 4,850,207
[45] Date of Patent: Jul. 25, 1989

[54] LOCK WITH FLEXIBLE CABLE
[75] Inventor: Kenth Ylven, Brogatan, Sweden
[73] Assignee: K. Ylvens Mekaniska, Brogatan II, Sweden
[21] Appl. No.: 113,608
[22] Filed: Oct. 22, 1987
[30] Foreign Application Priority Data
 Oct. 24, 1986 [DE] Fed. Rep. of Germany ... 8628436[U]
[51] Int. Cl.⁴ .............................................. E05B 67/06
[52] U.S. Cl. ....................................................... 70/49
[58] Field of Search ................... 70/14, 17, 18, 30, 49; 280/814

[56] References Cited
U.S. PATENT DOCUMENTS

| | | | |
|---|---|---|---|
| 1,539,301 | 5/1925 | Cooper | 70/49 |
| 3,585,823 | 6/1971 | Nagel | 70/49 |
| 4,003,228 | 1/1977 | Lievens et al. | 70/18 X |
| 4,075,878 | 2/1978 | Best | 70/49 |

FOREIGN PATENT DOCUMENTS 1520152  8/1978  United Kingdom .................... 70/49

Primary Examiner—Gary L. Smith
Assistant Examiner—Douglas E. Ringel
Attorney, Agent, or Firm—Andrus, Sceales, Starke & Sawall

[57] ABSTRACT

A cable unit includes a cable with a cable eye on one end. A lock body of a lock has a through-passage through which the cable extends and a pin recess extending parallel to the through-passage. The one end of the cable is bent back to the lock to form the eye. The locking pin is secured to the cable and releasably secured in the pin recess. A closed cable eye is fully secured to the opposite end of the cable. A flexible protective sheath covers the cable to the opposite sides of the lock. The through-passage diameter is slightly larger than the cable and smaller than the sheath. A lock recess in the body extends parallel to the through-passage with a key lock cylinder located in such recess. The body side including the lock recess is a flat plane which extends perpendicular to the lock cylinder axis and extends over the opening of the through-passage as an inclined plane at a selected angle to the cylinder axis. The opening has an offset inclined portion such that the cable extends laterally away from the lock cylinder. The pin has grooves intermediate its length and an outer tip portion which is surface-roughened and located within the end of the cable. A ferrule encircles the cable end, the tip portion and the grooves to fix the pin to the cable. A circumferential groove in the outer free end of the pin projects into the pin recess. A catch member within the lock body engages the groove to hold the pin in the body. A locking member on the lock cylinder holds the catch member within the groove to lock the cable to the lock body.

6 Claims, 2 Drawing Sheets

LOCK WITH FLEXIBLE CABLE

BACKGROUND OF THE INVENTION

The present innovation is directed to a cable, especially a wire cable, with a cable eye adapted to be opened. Cables of this type are generally known and are used for temporarily fastening or securing objects. But the conventional cables of this kind are not thief resistant, so that the eye of the cable can be opened without any special effort.

It is therefore the object of the present innovation to provide a cable of the specified kind in which the cable eye can be locked and, if required, opened again, while opening of the cable eye by unauthorized persons shall be possible only by destruction of the cable eye or the cable, respectively.

SUMMARY OF THE INVENTION

A cable unit having a cable eye adapted to be opened includes a cable having a first end and second end. A lock body of a lock has a through-passage through which the cable extends and a pin recess extending approximately parallel to the through-passage. The one end of the cable is bent back to the lock body to form an eye in the cable. A locking pin is secured to the bent end of the cable and is releasably secured within the pin recess in the body.

The end of the cable opposite the eye preferably includes a fixedly attached closed cable eye. A flexible protective sheath is secured to the cable to the opposite sides of the lock. The diameter of the through-passage is slightly larger than the cable and less than the sheath. The lock body includes a lock recess extending approximately parallel to the cable through-passage. A key lock cylinder is located in the lock recess.

The side of the lock body including the lock recess is a flat plane in the region of the lock recess and extends aproximately perpendicularly to the axis of the lock cylinder. The side extends over the opening of the through-passage as an inclined plane with a selected angle to the axis of the cylinder such that the cable exiting from the opening extends laterally away from the lock cylinder. The through-passage is preferably formed with an offset angled portion at the opening to direct the cable at the desired angle.

The locking pin is preferably formed with one or more circumferential grooves spaced from the free outer end which extends into the pin recess. The outer tip portion of the pin is formed as a surface-roughened anchoring tip. The tip of the pin is located within and surrounded by the end of the cable end. A ferrule encircles the cable end, the tip of the locking pin and the circumferential grooves to fixedly join the locking pin to the cable end.

The locking pin (30) is preferably formed with a circumferentially extending groove (46) in the outer free end. A catch member is movably disposed within the lock body (20) and resiliently engaged outwardly for releasably engaging the groove with the pin in the pin recess. A locking member is disposed within the lock cylinder and is actuated or moved to hold the catch member within the recess and lock the cable end to the lock body.

Other features are of special significance in respect of the handling of the cable according to the present innovation. By these additional features, the user, when opening or closing the lock by means of a key, is not obstructed by the cable which passes through the lock body. The corresponding measures are of an extremely simple and yet highly effective nature.

BRIEF DESCRIPTION OF THE DRAWINGS

Below, a preferred embodiment of the innovation is described in detail with reference to the accompanying drawing, in which.

DESCRIPTION OF THE ILLUSTRATED EMBODIMENT

Figure 1:
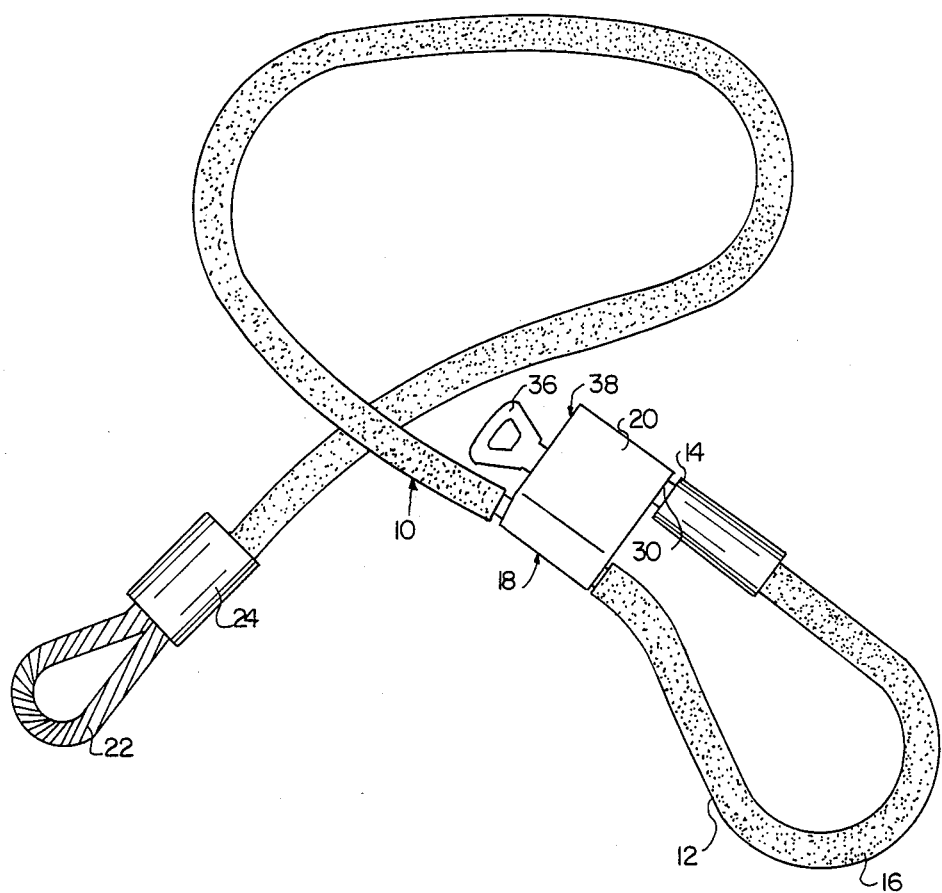
FIG. 1 is a perspective view of a cable in accordance with the present innovation with the cable eye in the closed position.

The cable 10 schematically illustrated in FIG. 1 comprises a cable eye 12 adapted to be opened with the connection between the cable 10 and the free end 14 of the bow 16 of the eye being made by a lock 18. The body 20 of the lock 18 is joined to the cable 10 preferably rigidly or non-slidably. At its end remote from the cable eye 12 which can be opened, the cable 10 includes a further cable eye 22 which is permanently closed in a conventional way, the permanent joint between the cable and cable end is shown made by a radially compressible lead or like ferrule or bushing 24.

Figure 2:
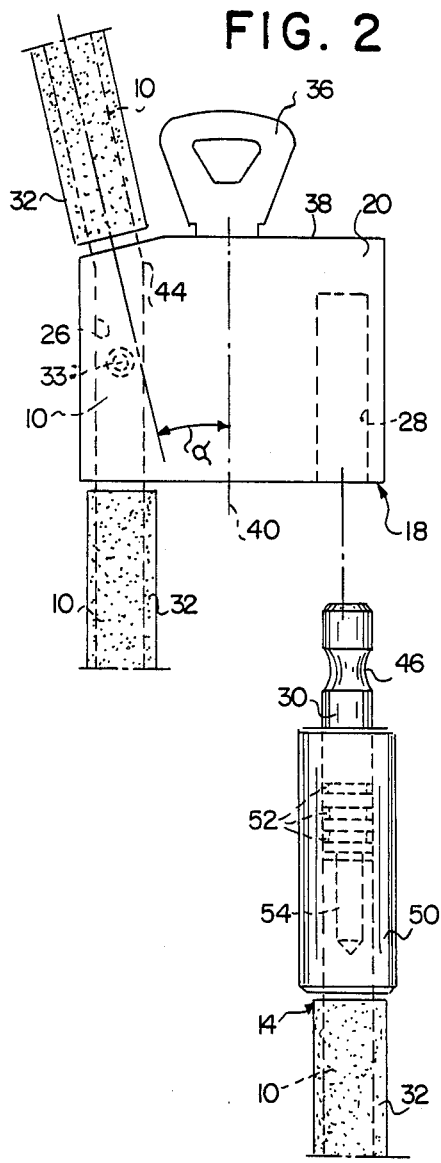
FIG. 2 is a schematic plan view of the means provided in accordance with the innovation for locking and opening the cable eye.
Figure 3:
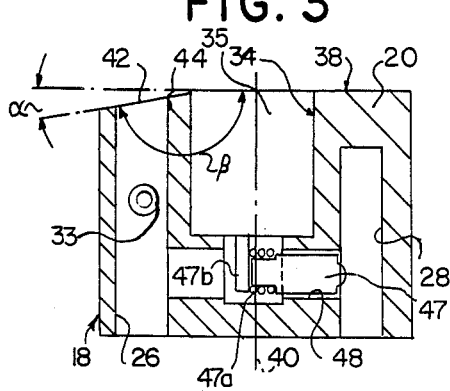
FIG. 3 is a longitudinal sectional view of the lock body used in accordance with the innovation.

In accordance with FIGS. 2 and 3, the lock body 20, which is preferably made from rust-proof metal, has a through-passage 26 for the cable 10 and a recess 28 extending in parallel to said through-passage for locking accommodating a locking pin 30 which is disposed at the free end 14 of the bow 16 of the eye.

In the illustrated embodiment, the cable 10 permanently fixed in the through-passage 26 of the lock body 20 by means of a protective sheath 32 which envelopes the cable 10 externally of the lock body 20 and is made from flexible plastic material. The inner diameter of the through-passage 26 formed within the lock body 20 is slightly larger than the outer diameter of the bare cable, but smaller than the outer diameter of the sheathed cable. In this way the lock body 20 is immovably retained on the cable 10 by the protective sheath 32, which extends right to the lock body 20 on either side thereof. An attachment 33 may be attached to the lock body to lock the body to the cable 10, as shown in FIGS. 2 and 3.

As will be apparent from FIG. 3, the lock body 20 comprises a further recess 34 extending in parallel to the cable through-passage 26 for receiving a lock cylinder 35 (not illustrated in detail) which cooperates with a key 36. The recess 34 for receiving the lock cylinder is formed on the side 38 of the lock body 20 remote from the cable eye 12 (see also FIG. 1). The side 38 of the lock body 20 where the recess 34 for the lock cylinder is formed is defined by a plane which in the region of the recess 34 for the lock cylinder extends approximately perpendicularly to the axis 40 of the lock cylinder or key axis, respectively, while in the adjacent region of the opening 42 associated with the through-passage 26 for the cable, said plane extends at an inclination to said axis such that the cable leading out from said opening can extend laterally away from the lock cylinder or the key 36, respectively (see FIGS. 1 and 2). In this way the key 36 is accessible without being obstructed by the cable.

Basically, it would also be conceivable in case of a straight passage of the cable 10 through the lock body 20 to dispose the lock cylinder at a slight inclination to the center axis of the through-passage for the cable such that there would be a divergence between the key 36 and the cable extending from the lock body 20 similar to what is shown in FIG. 2.

So as to permanently ensure the mentioned divergence between the key 36, on the one hand, and the cable 10 leading out from the lock body 20, on the other hand, the cable 10 extends from the lock body 20 at a predetermined angle α relative to the axis 40 of the lock cylinder such that it extends laterally away from the axis 40 of the lock cylinder or the key 36 inserted therein, as illustrated in FIGS. 1 or 2. To this end the through-passage 26 for the cable formed in the lock body 20 is made to bend away from the axis 40 of the lock cylinder in the upper portion 44 (as seen in FIG. 2) which faces the key opening such that the cable 10 extends from the lock body 20 at the angle α relative to the axis 40 of the lock cylinder.

As will be apparent from FIG. 3, the inclination is provided on the side 38 of the lock body 20 which is remote from the cable eye 12 at an angle $\alpha = 180° - \alpha$.

A further special feature is presented by the locking pin 30 which on its free end has a continuous or circumferentially extending groove 46 adapted to be latchingly engaged by a catch member which is movably disposed in the lock body 20. The catch member, which for example is a ball or peg 47, is disposed for transverse movement in a cross-bore 48 shown in FIG. 3 between the recess 34 for the lock cylinder and the recess 28 for the locking pin. In the release position of the lock 18 the catch member 47 is movable transversely preferably against the action of a resilient compression means such as a coiled compression spring 47a, so that the locking pin can be inserted into and removed from the recess 28 by urging the catch member sideways; when the locking pin 30 is fully inserted the catch member will be in engagement with the groove 46. Stop means 47b, which are provided in the lock cylinder 35 and not illustrated in detail, compress the spring 47a and prevent any movement of the catch member in the lock position. The key 36 will then be in the locking position, in which the key 36 shall be withdrawable from the lock body 20. In the release position for the locking pin 30, however, the key 36 shall be retained in the lock body 20.

The locking pin 30 is permanently anchored to the cable end or to the free end 14 of the bow 16 of the eye by means of a ferrule or bushing 50 made of lead or the like. For creating a secure joint between the ferrule 50 and the locking pin 30 the latter is provided on its end remote from the groove 46 with at least one—in the present case three—circumferential grooves 52 and with an anchoring tip 54 which has a roughened surface and is surrounded by the free end of the cable, especially wire cable 10, within the ferrule 50. In the region of the anchoring tip 54 a direct joint is thereby provided between locking pin 30, on the one hand, and wire cable 10, on the other hand, by radial compression of the ferrule 50.

In a preferred embodiment, the length of the cable 10 including the eye 12 is about 1 meter.

To summarize, it should be noted that the significant features are the oblique exit of the cable 10 from the lock body 20 on the key side thereof, and the special configuration of the locking pin 30 including anchoring thereof to the free cable end 14.

All of the features disclosed in the present documents are claimed as being essential for the invention to the extent to which they are novel over the prior art either individually or in combination.

I claim:

1. A cable unit having a cable eye (12) adapted to be opened, comprising a cable (10) having a first end (14) and a second end, a lock (18) having a lock body (20) joined to the cable (10) between the first and second ends of the cable, said lock body (20) having a through-passage (26) for the cable (10) and a pin recess (28) extending approximately parallel to said through-passage (26), said cable having said first end bent back to the lock body and forming en eye (12) in said cable, a locking pin (30) secured to the said first end (14), said body having releasable lock means to receive said pin and releasably lock said pin to said body, means securing said cable (10) in the associated through-passage (26) of the lock body (20), a flexible protective sheath (32) secured to said cable on the opposite sides of said lock body (20), the inner diameter of the cable through-passage (26) within the lock body (20) being slightly larger than the outer diameter of the cable but smaller than the outer diameter of said sheath.

2. The cable unit according to claim 1, wherein said releasable lock means includes a lock cylinder recess (34) in said body (20) extending approximately parallel to the cable through-passage (26), a lock cylinder located in said lock cylinder recess (34), said lock cylinder recess (34) being formed on the side (38) of the lock body (20) which is remote from the cable eye (12).

3. The cable unit according to claim 2, wherein said lock cylinder recess and lock cylinder have an axis (40), and said side (38) of the lock body (20) including said lock cylinder recess (34) is a flat plane in the region of the lock cylinder recess (34) and extends approximately perpendicularly to the lock cylinder axis (40), said plane extending over the end (42) of the cable through-passage (26) at an inclination to said axis (40) such that the cable (10) exiting from said through-passage at said end (42) extends laterally away from the lock cylinder.

4. The cable unit of claim 1 wherein a permanently closed cable eye (22) is secured to the second end of the cable (10).

5. The cable unit of claim 2 wherein said pin recess receives said locking pin, said locking pin (30) has an outer free end with a circumferentially extending groove (46), a catch member is movably disposed within the lock body (20) for releasably engaging said groove with said locking pin in said pin recess, and said lock cylinder actuates stop means to engage and hold the catch member within the groove and prevent movement of the catch member from the groove to release the pin.

6. The cable unit of claim 1 wherein the locking pin (30) includes at least one circumferential groove (52) spaced from the free end of said pin and a surface-roughened anchoring tip (54), said tip being located within and surrounded by said first end of said cable, a ferrule (50) encircling the cable end and the locking pin (30) in alignment with the circumferential groove (52) and the anchoring tip (54) to join the locking pin (30) and the cable end.

* * * * *